(12) United States Patent
Moser et al.

(10) Patent No.: US 8,139,212 B2
(45) Date of Patent: Mar. 20, 2012

(54) MEASUREMENT OF VOLUME HOLOGRAPHIC GRATINGS

(75) Inventors: Christophe Moser, Pasadena, CA (US); Frank Havermeyer, Arcadia, CA (US)

(73) Assignee: Ondax, Inc., Monrovia, CA (US)

( * ) Notice: Subject to any disclaimer, the term of this patent is extended or adjusted under 35 U.S.C. 154(b) by 0 days.

(21) Appl. No.: 13/115,080

(22) Filed: May 24, 2011

(65) Prior Publication Data

US 2011/0216316 A1 Sep. 8, 2011

Related U.S. Application Data

(63) Continuation of application No. 12/454,279, filed on May 15, 2009.

(60) Provisional application No. 61/127,799, filed on May 15, 2008.

(51) Int. Cl.
*G01J 3/28* (2006.01)
(52) U.S. Cl. ....................................................... 356/326
(58) Field of Classification Search .................. 356/326, 356/328
See application file for complete search history.

(56) References Cited

U.S. PATENT DOCUMENTS

| | | |
|---|---|---|
| 3,588,254 A | 6/1971 | Rhoades |
| 3,588,738 A | 6/1971 | Goodwin |
| 3,659,947 A | 5/1972 | Neumann |
| 3,902,135 A | 8/1975 | Terada |
| 4,017,144 A | 4/1977 | Staebler |
| 4,057,408 A | 11/1977 | Pierson |
| 4,103,254 A | 7/1978 | Chikami |
| 4,181,515 A | 1/1980 | Dyott |
| 4,456,328 A | 6/1984 | Arns |
| 4,794,344 A | 12/1988 | Johnson |
| 4,807,950 A | 2/1989 | Glenn |
| 4,824,193 A | 4/1989 | Maeda |
| 4,942,583 A | 7/1990 | Nazarathy |
| 5,042,898 A | 8/1991 | Morey |
| 5,107,365 A | 4/1992 | Ota |
| 5,221,957 A | 6/1993 | Jannson |
| 5,315,417 A | 5/1994 | Moss |
| 5,335,098 A | 8/1994 | Leyva |
| 5,388,173 A | 2/1995 | Glenn |
| 5,432,623 A | 7/1995 | Egan |
| 5,440,669 A | 8/1995 | Rakuljic |

(Continued)

FOREIGN PATENT DOCUMENTS

DE 4214014 11/1992

OTHER PUBLICATIONS

"More on analyzing the reflection of a laser beam by a deformed highly reflective volume Bragg grating using iteration of the beam propagation method," Shu, Hong et al. Applied Optics, vol. 48, No. 1 (Jan. 1, 2009).

(Continued)

*Primary Examiner* — Gregory J Toatley
*Assistant Examiner* — Abdullahi Nur
(74) *Attorney, Agent, or Firm* — Carr & Ferrell LLP

(57) ABSTRACT

The present invention relates to methods of measuring the optical characteristics of volume holographic gratings with high resolution and with a large spectral coverage using a spectrally broad band source in conjunction with instruments that measure the spectrum such as spectrometers, imaging spectrometers, and spectrum analyzers.

8 Claims, 5 Drawing Sheets

U.S. PATENT DOCUMENTS

| | | | |
|---|---|---|---|
| 5,491,570 A | 2/1996 | Rakuljic | |
| 5,517,525 A | 5/1996 | Endo | |
| 5,594,744 A | 1/1997 | Lefevre | |
| 5,625,453 A | 4/1997 | Matsumoto | |
| 5,636,304 A | 6/1997 | Mizrahi | |
| 5,640,256 A | 6/1997 | De Vre | |
| 5,657,121 A * | 8/1997 | Nishina | 356/327 |
| 5,684,611 A | 11/1997 | Rakuljic | |
| 5,691,989 A | 11/1997 | Rakuljic | |
| 5,771,250 A | 6/1998 | Shigehara | |
| 5,796,096 A | 8/1998 | Rakuljic | |
| 5,844,700 A | 12/1998 | Jeganathan | |
| 5,917,648 A | 6/1999 | Harker | |
| 5,943,128 A | 8/1999 | Slater | |
| 5,960,133 A | 9/1999 | Tomlinson | |
| 5,966,391 A | 10/1999 | Zediker | |
| 6,049,554 A | 4/2000 | Lang | |
| 6,100,975 A | 8/2000 | Smith | |
| 6,101,301 A | 8/2000 | Engelberth | |
| 6,139,146 A | 10/2000 | Zhang | |
| 6,147,341 A | 11/2000 | Lemaire | |
| 6,169,829 B1 | 1/2001 | Laming | |
| 6,192,062 B1 | 2/2001 | Sanchez-Rubio | |
| 6,211,976 B1 | 4/2001 | Popovich | |
| 6,221,535 B1 | 4/2001 | Cox | |
| 6,226,084 B1 | 5/2001 | Tormod | |
| 6,249,624 B1 | 6/2001 | Putnam | |
| 6,281,974 B1 | 8/2001 | Scheiner | |
| 6,304,687 B1 | 10/2001 | Inoue | |
| 6,327,283 B1 | 12/2001 | Hung | |
| 6,327,292 B1 | 12/2001 | Sanchez-Rubio | |
| 6,339,609 B2 | 1/2002 | Lefevre | |
| 6,356,684 B1 | 3/2002 | Patterson | |
| 6,363,187 B1 | 3/2002 | Fells | |
| 6,370,310 B1 | 4/2002 | Jin | |
| 6,396,982 B1 | 5/2002 | Lin | |
| 6,414,973 B1 | 7/2002 | Hwu | |
| 6,449,097 B1 | 9/2002 | Zhu | |
| 6,498,872 B2 | 12/2002 | Bouevitch | |
| 6,498,891 B1 | 12/2002 | Montesanto | |
| 6,507,693 B2 | 1/2003 | Maron | |
| 6,512,618 B1 | 1/2003 | Heflinger | |
| 6,568,220 B1 | 5/2003 | Paek | |
| 6,586,141 B1 | 7/2003 | Efimov | |
| 6,587,180 B2 | 7/2003 | Wang | |
| 6,606,152 B2 | 8/2003 | Littau | |
| 6,621,957 B1 | 9/2003 | Sullivan | |
| 6,628,862 B1 | 9/2003 | Yao | |
| 6,670,079 B1 | 12/2003 | Kitamura | |
| 6,673,497 B2 | 1/2004 | Efimov | |
| 6,714,309 B2 | 3/2004 | May | |
| 6,750,996 B2 | 6/2004 | Jagt | |
| 6,768,577 B2 | 7/2004 | Eggleton | |
| 6,788,849 B1 | 9/2004 | Pawluczyk | |
| 6,822,218 B2 | 11/2004 | Helmig | |
| 6,828,262 B2 | 12/2004 | Borrelli | |
| 6,829,067 B2 | 12/2004 | Psaltis | |
| 6,844,946 B2 | 1/2005 | Buse | |
| 6,847,763 B2 | 1/2005 | Eggleton | |
| 6,879,441 B1 | 4/2005 | Mossberg | |
| 6,904,200 B2 | 6/2005 | Wang | |
| 6,934,060 B2 | 8/2005 | Psaltis | |
| 6,987,907 B2 | 1/2006 | Psaltis | |
| 6,992,805 B2 | 1/2006 | Ingwall | |
| 7,002,697 B2 | 2/2006 | Domash | |
| 7,031,573 B2 | 4/2006 | Volodin | |
| 7,081,977 B2 | 7/2006 | Kim | |
| 7,081,978 B2 | 7/2006 | Chen | |
| 7,125,632 B2 | 10/2006 | Volodin | |
| 7,136,206 B2 | 11/2006 | Psaltis | |
| 7,173,950 B2 | 2/2007 | Hand | |
| 7,212,554 B2 | 5/2007 | Zucker | |
| 7,245,369 B2 | 7/2007 | Wang | |
| 7,245,407 B2 | 7/2007 | Komma | |
| 7,248,617 B2 | 7/2007 | Volodin | |
| 7,248,618 B2 | 7/2007 | Volodin | |
| 7,273,683 B2 | 9/2007 | Volodin | |
| 7,298,771 B2 | 11/2007 | Volodin | |
| 7,355,768 B1 | 4/2008 | Billmers | |
| 7,359,046 B1 | 4/2008 | Steckman | |
| 7,359,420 B2 | 4/2008 | Shchegrov | |
| 7,372,565 B1 | 5/2008 | Holden | |
| 7,391,703 B2 | 6/2008 | Volodin | |
| 7,397,837 B2 | 7/2008 | Volodin | |
| 7,477,818 B2 | 1/2009 | Volodin | |
| 7,483,190 B2 | 1/2009 | Psaltis | |
| 7,528,385 B2 | 5/2009 | Volodin | |
| 7,542,639 B2 | 6/2009 | Moser | |
| 7,545,844 B2 | 6/2009 | Volodin | |
| 7,548,313 B2 | 6/2009 | Nguyen | |
| 7,570,320 B1 | 8/2009 | Anderson | |
| 7,590,162 B2 | 9/2009 | Volodin | |
| 7,605,911 B2 | 10/2009 | Wieloch | |
| 7,633,985 B2 | 12/2009 | Volodin | |
| 7,636,376 B2 | 12/2009 | Moser | |
| 7,639,718 B1 | 12/2009 | Moser | |
| 7,667,882 B2 | 2/2010 | Adibi | |
| 7,697,589 B2 | 4/2010 | Volodin | |
| 7,719,675 B2 | 5/2010 | Grygier | |
| 7,746,480 B2 | 6/2010 | Ozcan | |
| 7,792,003 B2 | 9/2010 | Volodin | |
| 7,796,673 B2 | 9/2010 | Volodin | |
| 7,817,888 B2 | 10/2010 | Volodin | |
| 7,830,507 B2 * | 11/2010 | Brady et al. | 356/328 |
| 2001/0050751 A1 | 12/2001 | Banyai | |
| 2002/0015376 A1 | 2/2002 | Liu | |
| 2002/0045104 A1 | 4/2002 | Efimov | |
| 2002/0093701 A1 | 7/2002 | Zhang | |
| 2002/0141063 A1 | 10/2002 | Petrov | |
| 2002/0154345 A1 | 10/2002 | Ozaki | |
| 2002/0181035 A1 | 12/2002 | Donoghue | |
| 2003/0007202 A1 | 1/2003 | Moser | |
| 2003/0011833 A1 | 1/2003 | Yankov | |
| 2003/0072336 A1 | 4/2003 | Senapati | |
| 2003/0128370 A1 | 7/2003 | De Lega | |
| 2003/0156607 A1 | 8/2003 | Lipson | |
| 2003/0169787 A1 | 9/2003 | Vurgaftman et al. | |
| 2003/0190121 A1 | 10/2003 | Luo | |
| 2003/0210863 A1 | 11/2003 | Myers | |
| 2003/0231305 A1 | 12/2003 | Zeng | |
| 2004/0021920 A1 | 2/2004 | Psaltis | |
| 2004/0165639 A1 | 8/2004 | Lang | |
| 2004/0191637 A1 | 9/2004 | Steckman | |
| 2004/0253751 A1 | 12/2004 | Salnik | |
| 2004/0258356 A1 | 12/2004 | Brice | |
| 2005/0018743 A1 | 1/2005 | Volodin | |
| 2005/0129072 A1 | 6/2005 | Tayebati | |
| 2005/0206984 A1 | 9/2005 | Kawano | |
| 2005/0226636 A1 | 10/2005 | Hiramatsu | |
| 2005/0248819 A1 | 11/2005 | Hymel | |
| 2005/0248820 A1 | 11/2005 | Moser | |
| 2005/0270607 A1 | 12/2005 | Moser | |
| 2006/0029120 A1 | 2/2006 | Mooradian | |
| 2006/0098258 A1 | 5/2006 | Chen | |
| 2006/0114955 A1 | 6/2006 | Steckman | |
| 2006/0156241 A1 | 7/2006 | Psaltis | |
| 2006/0251143 A1 | 11/2006 | Volodin | |
| 2006/0256830 A1 | 11/2006 | Volodin | |
| 2006/0280209 A1 | 12/2006 | Treusch | |
| 2007/0047608 A1 | 3/2007 | Volodin | |
| 2007/0160325 A1 | 7/2007 | Son | |
| 2010/0027001 A1 | 2/2010 | Moser | |
| 2010/0103489 A1 | 4/2010 | Moser | |
| 2010/0110429 A1 | 5/2010 | Simoni | |
| 2010/0149647 A1 | 6/2010 | Figueroa | |
| 2011/0216384 A1 | 9/2011 | Moser et al. | |

OTHER PUBLICATIONS

Askins, "Fiber Bragg refractors prepared by a single excimer pulse," Opt. Lett., vol. 17(11), pp. 833-835 (1992).

Bochove, E.J. et al. "Theory of Spectral Beam Combining of Fiber Lasers." IEEE J. Quant. Elec., 38.5 (2002).

Burr, Geoffrey et al. "Angle and Space Multiplexed Holographic Storage Using the 90 degree Geometry," Optics Comm. 117 (1995).

Curtis, Kevin et al. "Cross Talk for Angle- and Wavelength-Multiplexed Image Plane Holograms." Optics Letters, vol. 19 (21) (1994).

Daneu. V. et al. "Spectral Beam Combining of a Broad-Stripe Diode Laser Array in an External Cavity," Opt. ett. 25:6 (2000).

Dos Santos, Paulo et al. "Interference-term Real-time Measurement for Self-stablized Two-wave Mixing in Photorefractive Crystals," Optics Letters, Nov. 1988, vol. 13, No. 11, pp. 1014-1016.

Ford, Joseph et al. "Wavelength Add-Drop Switching Using Tilting Micromirrors," Journal of Lightwave Technology, vol. 17, No. 5 (May 1999).

Frejlich, Jamie et al. "Analysis of an Active Stabliziation System for a Holographic Setup," Applied Optics, May 15, 1988, vol. 27, No. 10, pp. 1967-1976.

Goodman, Joseph W. "Introduction to Fourier Optics," 1968, pp. 198-224.

Havermeyer, Frank et al. "Volume Holographic Grating-Based Continuously Tunable Optical Filter," Opt. Eng. 43(9), Sep. 2004, pp. 2017-2021.

Heaney et al., "Sol-gel derived photosensitive germanosilicate glass monoliths," Opt. Lett., vol. 25(24), pp. 1765-1767 (Dec. 2000).

Hill, "Photosensitivity in optical fiber waveguides: Application to reflection filter fabrication," Appl. Opt. Lett. vol. 32(10), pp. 647-649 (1978).

Hill, "Simple Transient Holograms in Ruby," Appl. Opt., vol. 10(7), pp. 1695-1697 (1971).

In re Rose, 220 F.2d 459, 105 USPQ 237-241 (CCPA 1955).

Kogelnik, Herwig. "Coupled Wave Theory for Thick Hologram Gratings," The Bell System Tech. Journal. Nov. 1969, vol. 48, No. 9, pp. 2909-2947.

Levene, Michael et al. "Method for Controlling the Shift Invairance of Optical Correlators," Applied Optics, Jan. 10, 1999, vol. 38, No. 2, pp. 394-398.

Li, Lijun et al. "Experimental Studies on Narrow-Linewidth YB+-Doped Double-Clad Fiber-Laser Cavities Based on Double-Clad Fiber Bragg Gratings," Microwave and Optical Technology Letters, 44(1):53-56 (2005).

Littman, Michael G. "Singlemode Operation Grazing-Incidence Pulsed Dye Laser," Optics Letters, Oct. 1978, vol. 3, pp. 138-140.

Mill, P. "Single Mode Operation of a 1.55 Micrometer Semi-conductor Laser Using a Volume Holographic Grating," Jul. 1985, Electronics Letters.

Mitchard, Gordon et al. "Double-Clad Fibers Enable Lasers to Handle High Power," Laser Focus World. Jan. 1999.

Miyazaki, T. et al. "Nd-Doped Double-Clad Fiber Amplifier at 1.06um," Journal of Lightwave Technology, 16(4): 562-566 (Apr. 1998).

Moser, Christopher. "Folded Shift Multiplexing." Optics Letters, vol. 28 (11) (Jun. 2003).

Sadot, D. et al. "Tunable Optical Filters for Dense WDM Networks," IEEE Communications Magazine,50-55 (1998).

Saleh, B. and M. Teich, "Fundamentals of Photonics," Wiley-Interscience, p. 151, 631-632 (1991).

Smith, Warren. "Modern Optical Engineering," 1990, pp. 43-47.

Steckman, Gregory J. et al. "Holographic Data Storage in Phenanthrenequinone Doped PMMA," SPIE Photonics West, San Jose, CA (Jan. 27, 1999).

Steckman, Gregory J. et al. "Holographic Multiplexing in Photorefractive Polymers," Optics Communications, Nov. 1, 2000, 185, pp. 13-17.

Steckman, Gregory J. et al. "Storage Density of Shift-Multiplexed Holographic Memory," Applied Optics, Jul. 10, 2001, vol. 40, No. 20, pp. 3387-3394.

Venus, George et al. "Semiconductor 1.7 W Volume Bragg Laser with Divergence Close to a Diffraction Limit," 26th Annual Conference on Lasers and Electro-Optics. CLEO/IQES and PhAST Technical Digest. Paper Code CFG4, Long Beach, CA, May 2006.

Volodin, B.L. et al. "Wavelength Stabilization and Spectrum Narrowing of High-Power Multimode Laser Diodes and Arrays by Use of Volume Bragg Gratings," Optics Letters, vol. 29, No. 16 (Aug. 15, 2004).

Yiou, Silvie et al. "Improvement of the Spatial Beam Quality of Laser Sources with an Intracavity Bragg Grating," Opt. Lett, 28 (4), 242 (2003).

Zorabedian, Paul, "Tunable Laser Handbook—tunable external-davity semi-conductor laser," Chapter 8, Academic Press (1995).

Bosomworth et al. "Thick holograms in photochromic material" Applied Optics [Online] 1968, 7(1), Abstract.

Erdei et al. "Optimization method for the design of beam shaping system" Optical Engineering [Online] 2002, 41, Abstract.

Shu et al. "More on analyzing the reflection of a laser beam by a deformed highly reflective volume Bragg grating using iteration of the beam propagation method" Applied Optics [Online] 2009, 48 (1), pp. 22-27.

* cited by examiner

US 8,139,212 B2

MEASUREMENT OF VOLUME HOLOGRAPHIC GRATINGS

CROSS-REFERENCE TO RELATED APPLICATIONS

The present patent application is a continuation and claims the priority benefit of U.S. patent application No. 12/454,279 filed May 15, 2009, which claims the priority benefit of U.S. Provisional Pat. App. No. 61/127,799 filed May 5, 2008.

BACKGROUND OF THE INVENTION

1. Field of the Invention

The present invention relates to methods of measuring the optical characteristics of volume holographic gratings with a large spectral coverage.

2. Notice of Material Subject to Copyright Protection

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

3. Description of the Related Art

Characteristics of volume holographic gratings are well known. When the Bragg condition $\lambda_r=2n(\lambda_r)\Lambda\cos(\theta_r)$, is satisfied the grating will diffract the incident beam into an output beam where $\lambda_r$ is the readout wavelength in vacuum, $n(\lambda_r)$ is the refractive index of the volume holographic grating element material at the readout wavelength, $\Lambda$ is the grating spacing, and $\theta$ is the readout angle of incidence inside the material. The paper by H. Kogelnik ("Coupled wave theory for Thick Hologram gratings", H. Kogelnik, The Bell System Tech. J. 48:9, 1969) provides details of volume holographic grating diffraction. For a simple uniform grating, the characteristics are completely determined by the thickness of the volume element, the refractive index modulation depth, the grating spacing, and the slant angle relative to the surface normal. For mass production of volume holographic grating elements it is desirable to measure these characteristics at the wafer level before dicing into final parts of smaller size.

U.S. Pat. No. 7,359,046 discloses methods to measure the optical characteristics of volume holographic gratings (VHG). The method relies on the concept of a collimated laser source 200 and a volume holographic grating 230 placed on a rotation stage 220 (FIG 1.). By using a fixed laser wavelength whose value is below the normal incidence Bragg wavelength of the VHG, the optical characteristics of the VHG can be determined by rotating the VHG. High spectral and spatial resolution has been shown with this method.

The inconvenience of the method disclosed in U.S. Pat. No. 7,359,046 is that it requires single frequency laser sources. It is difficult and very expensive to find laser sources covering a wide spectral range such as for example UV to infrared (300 nm to 4000 nm).

SUMMARY OF THE INVENTION

The invention disclosed here teaches methods and apparatus to measure the characteristics of volume holographic gratings with high spectral and spatial resolution over a wide spectral range.

BRIEF DESCRIPTION OF THE DRAWINGS

These and other features, aspects and advantages of the present invention will become better understood with regard to the following description, appended claims and accompanying drawings where:

DETAILED DESCRIPTION

In the following description of the present invention, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
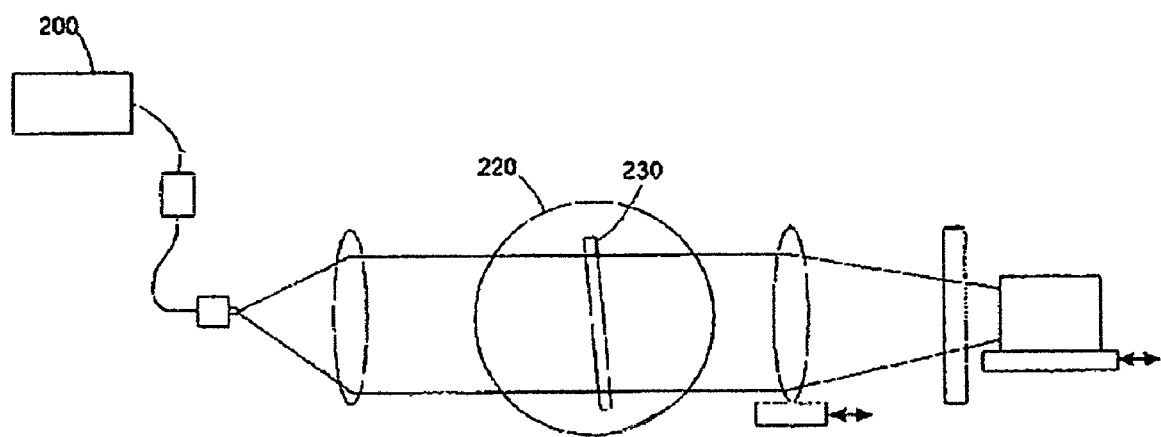
FIG. 1: (prior art): Schematic of an apparatus to measure VHG with high spectral and spatial resolution.
Figure 2:
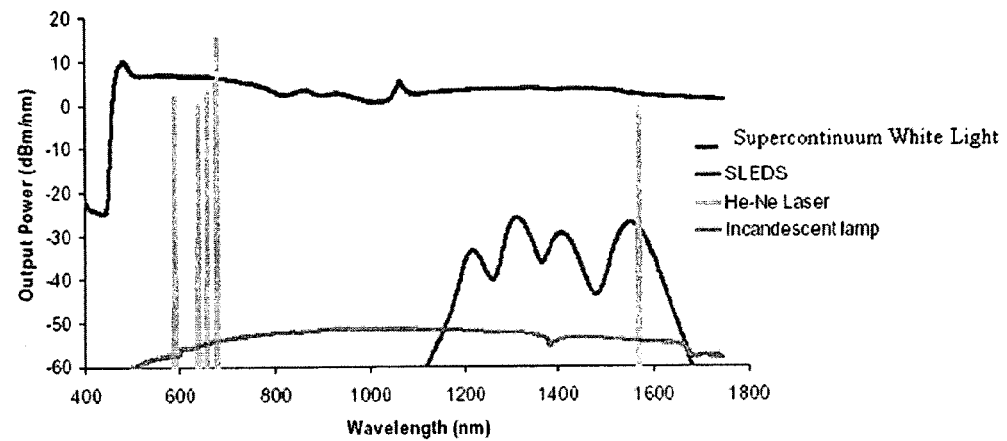
FIG. 2: (prior art) Spectra from Superluminescent LED (SLED), white light supercontinuum, incandescent light and various single mode lasers.
Figure 3:
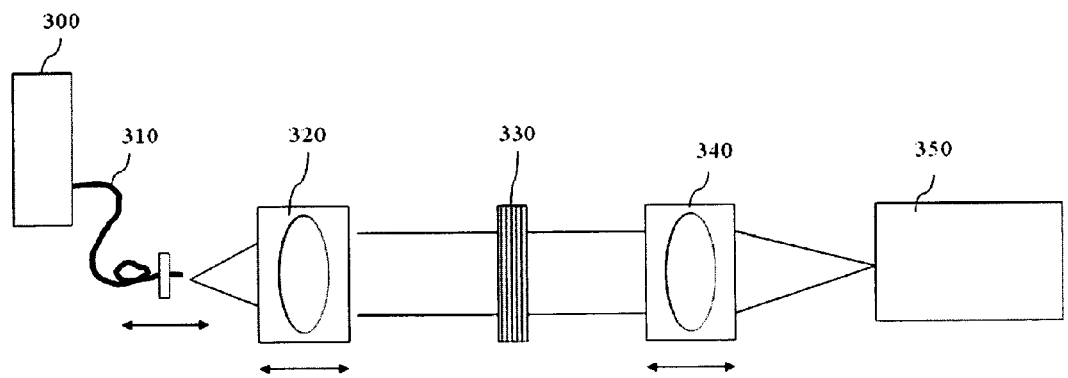
FIG. 3: Schematic of an apparatus for measuring VHG with low spatial resolution and wide spectral coverage.

In a first embodiment illustrated by FIG. 3, the light from a broad-band source 300, such as, but not limited, to a Superluminescent Light Emitting Diode (SLED), a high brightness lamp, or more recently, a supercontinuum white light source, is coupled into a fiber 310 which can be either single mode or multimode in the spectral range of interest. FIG. 2 is a prior art diagram illustrating spectra from superluminescent LED (SLED), white light supercontinuum, incandescent light and various single mode lasers. The preferred embodiment is a supercontinuum white light source which has a continuous spectral coverage from approximately 400 nm to 2500 nm. The power level of the white light source is now reaching 6 W in a fiber core diameter of 3 micrometers. A collimating lens element 320 collimates the light from the broad-band source to provide a diffraction limited collimated beam. With a multimode fiber core, the diameter of the collimated beam needs to be large enough so that the angular divergence is smaller than the acceptance angle of the VHG element 330 near normal incidence. The VHG element 330 to be tested is placed in the path of the collimated light beam. This can be done for example, but not limited to, using the facet reflection of the VHG. The angle between the incident beam and the surface of the VHG element 330 is aligned to a pre-determined value. In one embodiment, a lens element 340 captures the light after the VHG element 330 and feeds it into a high resolution spectrometer or spectrum analyzer 350. In this embodiment the spectrum analyzer 350 capture the whole beam of light which results in coarse spatial resolution.

Figure 4:
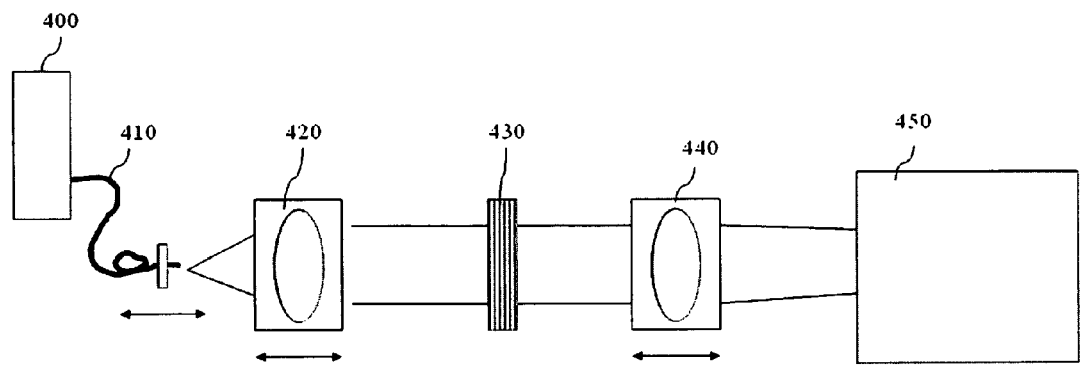
FIG. 4: Schematic of an apparatus for measuring VHG with high spatial resolution and wide spectral coverage.

In a variation of the previous embodiment, illustrated in FIG. 4, the light from a broadband source (e.g. supercontinuum source but not limited to) 400 is coupled into a fiber 410. The light coming out of the fiber 410 is then collimated by lens element 420 and incident of the VHG element 430. The lens element 440 and spectrometer 450 form an imaging spectrometer: at each pixel in the imaging spectrometer corresponds a spectral measurement. This method provides a high spatial resolution. The available high power from a supercontinuum source, for example, but not limited to, makes this method practical.

Figure 5:
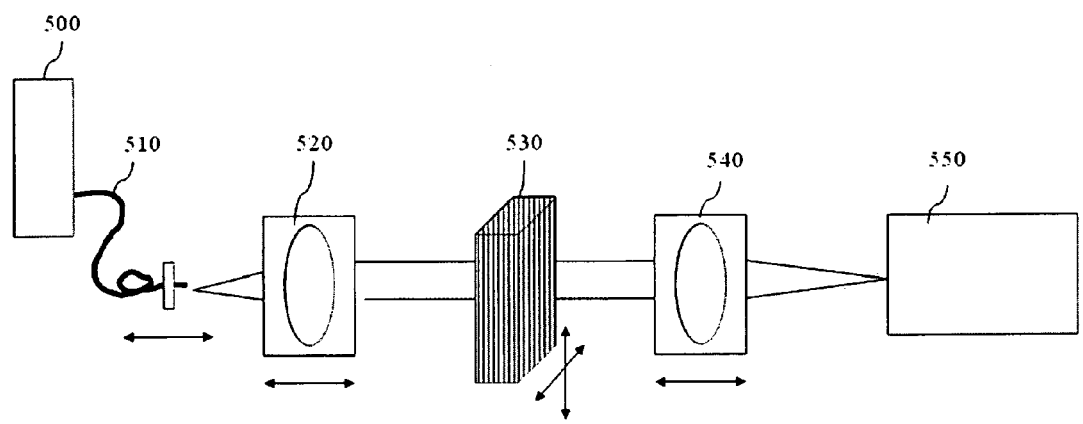
FIG. 5: Schematic of an apparatus for measuring VHG with a step and scan giving medium spatial resolution and wide spectral coverage.

In another embodiment, illustrated in FIG. 5, the light from a broadband source (e.g. supercontinuum source but not limited to) 500 is coupled into a fiber 510. The light coming out of the fiber 510 is then collimated by lens element 520 and incident of the VHG element 530. The collimated beam size is made small and the VHG element 530 is spatially moved perpendicularly to the collimated beam in two dimensions so as to provide a spatial resolution of the order of the collimated beam spot size. The transmitted beam is fed into a high resolution spectrum analyzer 550 via lens element 540.

Figure 6:
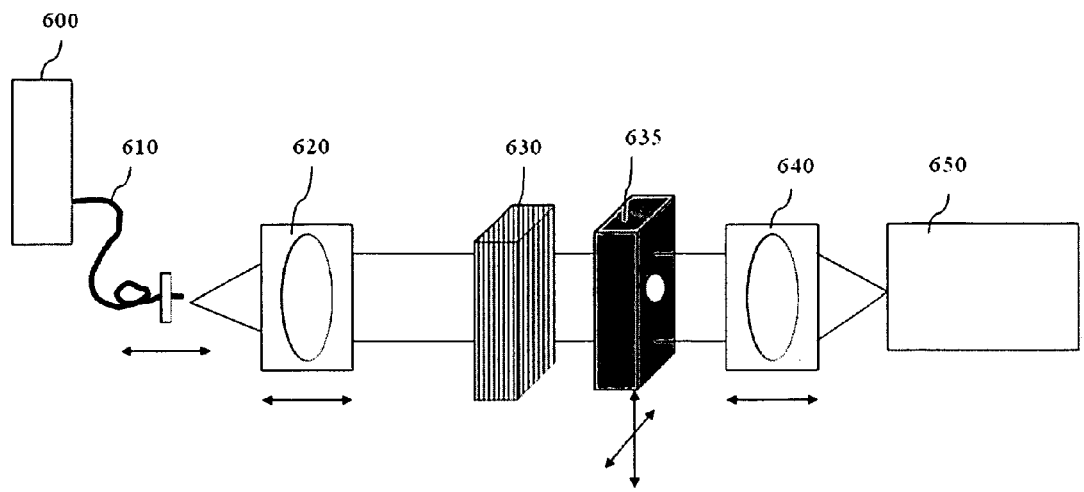
FIG. 6: Schematic of another embodiment showing an apparatus for measuring VHG with step and scan giving medium spatial resolution and wide spectral coverage.

In another embodiment, illustrated in FIG. 6, the light from a broadband source (e.g. supercontinuum source but not limited to) 6.00 is coupled into a fiber 610. The light coming out of the fiber 620 is then collimated by lens element 620 and incident of the VHG element 630. The collimated beam size is large, comparable in size with the VHG element 630. An aperture 635 is placed after the VHG element 630. The aperture 635 is translated perpendicularly to the collimated beam and in two dimensions to provide a selection of the area on the VHG element 630.

The transmitted beam is fed into a high resolution spectrum analyzer 650 via lens element 640.

Figure 7:
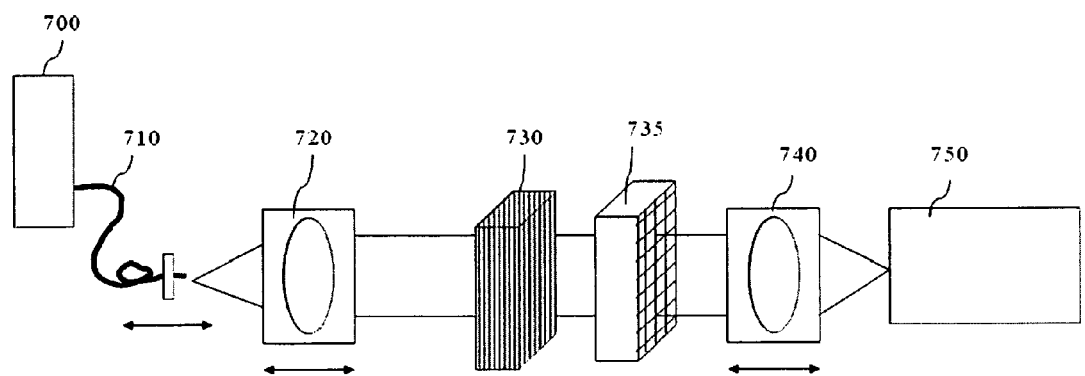
FIG. 7: Schematic of another embodiment apparatus for measuring VHG with high spatial resolution and wide spectral coverage.

In yet another embodiment, illustrated in FIG. 7, the light from a broadband source (e.g. supercontinuum source but not limited to) 700 is coupled into a fiber 710. The light coming out of the fiber 720 is then collimated by lens element 720 and incident of the VHG element 730. The collimated beam size is large, comparable in size with the VHG element 730. A mechanically fixed aperture system 735 is placed after the VHG element 630. The said fixed aperture system 735 provides a non-mechanical mean of switchable apertures such as provided by a Liquid Crystal modulator. The transmitted beam is fed into a high resolution spectrum analyzer 750 via lens element 740.

Figure 8:
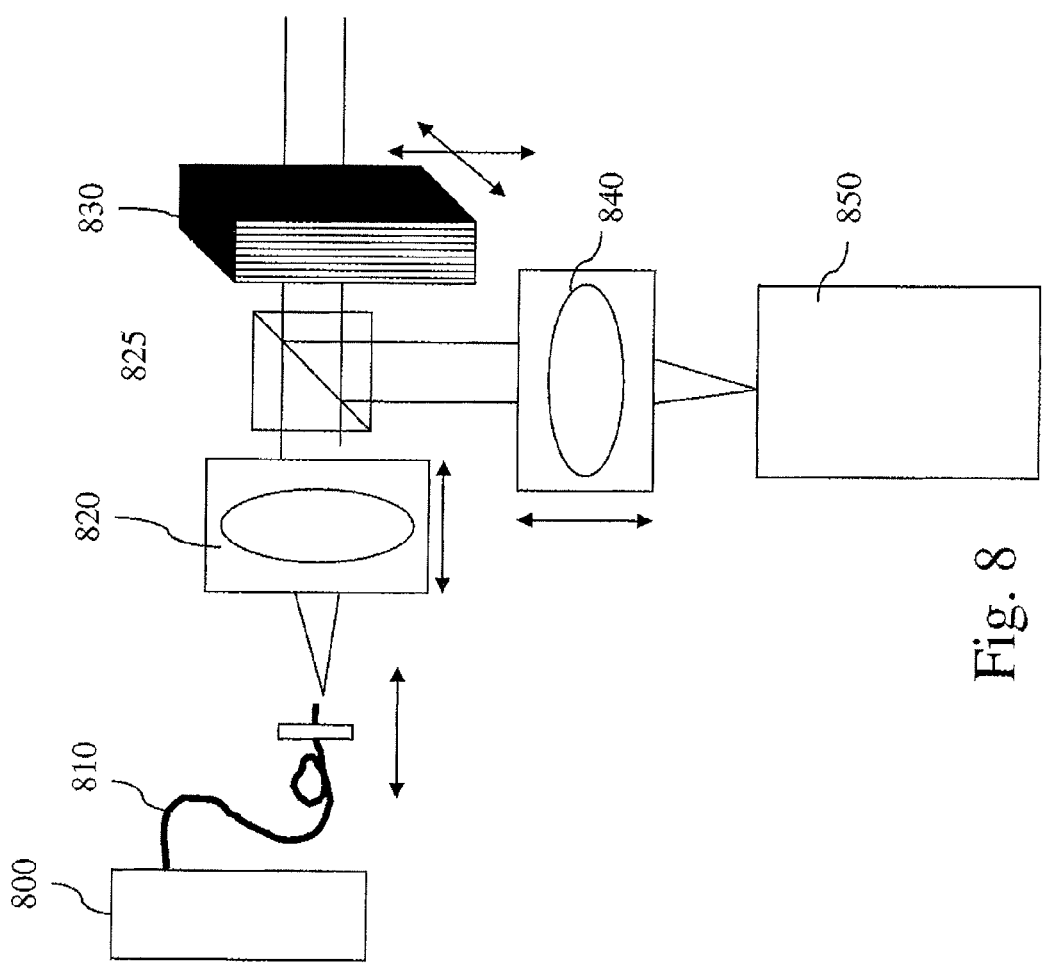
FIG. 8: Schematic of another embodiment showing an apparatus for measuring VHG with step and scan giving medium spatial resolution, high signal to noise ratio and wide spectral coverage.

In yet another embodiment, illustrated in FIG. 8, the light from a broadband source (e.g. supercontinuum source but not limited to) 800 is coupled into a fiber 810. The light coming out of the fiber 810 is then collimated by lens element 820. The collimated beam size is made small in comparison to the size of the reflective VHG element 830. A beam-splitter 825 is placed between the collimating lens 820 and the reflective VHG element 830. The VHG element is spatially moved perpendicularly to the collimated beam in two dimensions so as to provide a spatial resolution of the order of the collimated beam spot size. The antiparallel diffracted beam from the reflective VHG element 830 enters the beam splitter 825 again and a portion of it is reflected by the beam splitter 825 in to a high-resolution spectrometer 850 via the lens element 840.

In all embodiments, the lens elements, fiber tip can be placed on translation stages so that diffraction limited collimation can be achieved for a wide spectral range.

In all embodiments, the apparatus can be calibrated by taking measurements without the sample in place. This will effectively eliminate measurement errors due to non-constant source spectra and wavelength dependencies of detectors or spectrometers.

It is to be understood that the invention is not limited to only work with light from a supercontinuum source, but of any sufficiently collimated source of broad-band electromagnetic radiation, such as microwaves or terahertz waves, and is not limited to any specific range of the electro-magnetic spectrum. The invention is not limited to any specific material that contains volume holographic gratings, but applies to any and all materials that can store amplitude, phase, or some combination of the two.

Thus, systems and methods are described in conjunction with one or more specific embodiments. The invention is defined by the claims and their full scope of equivalents.

What is claimed is:

1. A method for measuring a volume holographic grating over a spectral range, the method comprising:
    generating a spectrometer image of a broadband light beam diffracted by an area of a volume holographic grating, the broadband light beam having a continuous spectral coverage range and the spectrometer image including a pixel; and
    determining one or more characteristics of the area of the volume holographic grating based on the pixel in the spectrometer image corresponding to a spectral measurement indicative of the one or more characteristics selected from the group consisting of diffraction efficiency, thickness, refractive index modulation depth, grating spacing, slant angle, and bulk transmission.

2. The method of claim 1, further comprising capturing the diffracted light beam in a lens, the lens feeding the diffracted light beam into a spectrum analyzer.

3. The method of claim 1, further comprising passing a portion of the diffracted light beam though an aperture to the spectrum analyzer, the aperture corresponding to the area of the volume holographic grating, wherein the spectrometer image is generated for the portion of the diffracted light beam.

4. The method of claim 1, wherein generating a spectrometer image comprises moving the volume holographic grating spatially in two dimensions to provide a spatial resolution of the order of a beam size.

5. An apparatus for measuring a volume holographic grating, the apparatus comprising:
    a light source for generating a broadband light beam having a continuous spectral coverage range, wherein an area of a volume holographic grating placed in a path of the light beam diffracts the light beam;
    a spectrum analyzer for generating a spectrometer image of the diffracted light beam, wherein a pixel in the spectrometer image corresponds to a spectral measurement indicative of one or more characteristics of the area of the volume holographic grating, the one or more characteristics selected from the group consisting of diffraction efficiency, thickness, refractive index modulation depth, grating spacing, slant angle, and bulk transmission.

6. The apparatus of claim 5, further comprising a lens for capturing the diffracted light beam and feeding the diffracted light beam into the spectrum analyzer.

7. The apparatus of claim 5, further comprising an aperture corresponding to the area on the volume holographic grating, the aperture passing a portion of the diffracted light beam to the spectrum analyzer, wherein the spectrometer image is generated for the portion of the diffracted light beam.

8. The apparatus of claim 5, wherein generating the spectrometer image comprises moving the volume holographic grating spatially in two dimensions to provide a spatial resolution of the order of a beam size.

* * * * *